(12) United States Patent
Hersam et al.

(10) Patent No.: US 11,916,234 B2
(45) Date of Patent: Feb. 27, 2024

(54) ANHYDROUS LIQUID-PHASE EXFOLIATION OF PRISTINE ELECTROCHEMICALLY-ACTIVE GeS NANOSHEETS

(71) Applicant: NORTHWESTERN UNIVERSITY, Evanston, IL (US)

(72) Inventors: Mark C. Hersam, Wilmette, IL (US); David Lam, Chicago, IL (US); Kan-Sheng Chen, Chicago, IL (US); Joohoon Kang, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 641 days.

(21) Appl. No.: 16/755,680

(22) PCT Filed: Oct. 17, 2018

(86) PCT No.: PCT/US2018/056296
§ 371 (c)(1),
(2) Date: Apr. 13, 2020

(87) PCT Pub. No.: WO2019/079457
PCT Pub. Date: Apr. 25, 2019

(65) Prior Publication Data
US 2021/0194003 A1      Jun. 24, 2021

Related U.S. Application Data

(60) Provisional application No. 62/575,067, filed on Oct. 20, 2017.

(51) Int. Cl.
*H01M 4/58* (2010.01)
*C01G 17/00* (2006.01)
(Continued)

(52) U.S. Cl.
CPC .......... *H01M 4/5815* (2013.01); *C01G 17/00* (2013.01); *H01M 10/0525* (2013.01);
(Continued)

(58) Field of Classification Search
CPC ......... H01M 4/5815; H01M 2004/027; H01M 10/0525; C01G 17/00; C01P 2002/77;
(Continued)

(56) References Cited

U.S. PATENT DOCUMENTS 9,114,405 B2   8/2015   Green et al.
9,221,064 B2  12/2015   Hersam et al.
(Continued)

FOREIGN PATENT DOCUMENTS

KR    101400524 B1 *  5/2014
WO    2013120907 A1   8/2013

OTHER PUBLICATIONS

Hyun et al., KR 101400524 B1, May 2014, Espacenet machine translation (Year: 2014).*
(Continued)

*Primary Examiner* — Adam A Arciero
(74) *Attorney, Agent, or Firm* — Locke Lord LLP; Tim Tingkang Xia, Esq.

(57) ABSTRACT

Anhydrous liquid-phase exfoliation of germanium sulfide to provide few-layer germanium sulfide, as can be incorporated into electronic devices such as but not limited to batteries and cells comprising such materials.

20 Claims, 12 Drawing Sheets

(51) Int. Cl.
*H01M 10/0525* (2010.01)
*H01M 4/02* (2006.01)

(52) U.S. Cl.
CPC ...... *C01P 2002/77* (2013.01); *C01P 2002/82* (2013.01); *C01P 2002/84* (2013.01); *C01P 2002/85* (2013.01); *C01P 2004/04* (2013.01); *C01P 2004/24* (2013.01); *C01P 2006/40* (2013.01); *H01M 2004/027* (2013.01)

(58) Field of Classification Search
CPC .............. C01P 2002/82; C01P 2002/84; C01P 2002/85; C01P 2004/04; C01P 2004/24; C01P 2006/40
See application file for complete search history.

(56) References Cited

U.S. PATENT DOCUMENTS

| | | |
|---|---|---|
| 2014/0287237 A1 | 9/2014 | Mahler |
| 2014/0322610 A1 | 10/2014 | Bosnyak et al. |
| 2015/0188125 A1* | 7/2015 | Korgel ................ H01M 4/1393 429/188 |
| 2017/0044683 A1 | 2/2017 | Cullen et al. |

OTHER PUBLICATIONS

Gupta, Amit et al., "Liquid-phase exfoliation of MoS2 nanosheets: The critical role of trace water", The Journal of Physical Chemistry Letter, 2016, vol. 7, pp. 4884-4890.

Lam, David et al., "Anhydrous liquid-phase exfoliation of pristine electromchemically active GeS nanosheets", Chemistry of Materials, Mar. 20, 2018, vol. 30, No. 7, pp. 2245-2250.

Korean Intellectual Property Office (ISR/KR), "International Search Report for PCT/US2018/056296", Korea, dated Apr. 8, 2019.

Xiao, J.; Choi, D.; Cosimbescu, L.; Koech, P.; Liu, J.; Lemmon, J. P. Exfoliated M0S2 Nanocomposite as an Anode Material for Lithium Ion Batteries. Chem. Mater. 2010, 22 (16), 4522-4524.

Bhandavat, R.; David, L.; Singh, G. Synthesis of Surface-Functionalized WS2 Nanosheets and Performance as Li-Ion Battery Anodes. J. Phys. Chem. Lett. 2012, 3 (11), 1523-1530.

Du, G.; Guo, Z.; Wang, S.; Zeng, R.; Chen, Z.; Liu, H. Superior Stability and High Capacity of Restacked Molybdenum Disulfide as Anode Material for Lithium Ion Batteries. Chem. Commun. 2010, 46 (7), 1106-1108.

Chen, L.; Zhou, G; Liu, Z.; Ma, X.; Chen, L; Zhang, Z.; Ma, X.; Li, F.; Cheng, H. M.; Ren, W. Scalable Clean Exfoliation of High-Quality Few-Layer Black Phosphorus for a Flexible Lithium Ion Battery. Adv. Mater. 2016, 28 (3), 510-517.

Jing, Y.; Ortiz-Quiles, E. O.; Cabrera, C. R.; Chen, Z.; Zhou, Z. Layer-by-Layer Hybrids of MoS2 and Reduced Graphene Oxide for Lithium Ion Batteries. Electrochim. Acta 2014, 147 (I), 392-400.

Kokai, F.; Sorin, R.; Chigusa, H.; Hanai, K.; Koshio, A.; Ishihara, M.; Koga, Y.; Hasegawa, M.; Imanishi, N.; Takeda, Y. Ultrasonication Fabrication of High Quality Multilayer Graphene Flakes and Their Characterization as Anodes for Lithium Ion Batteries. Diam. Relat. Mater. 2012, 29 (1), 63-68.

Liu, Y.; Ren, L.; Qi, X.; Yang, L.; Li, j.; Wang, Y.; Zhong, J. Hydrothermal Exfoliated Molybdenum Disulfide Nanosheets as Anode Material for Lithium Ion Batteries. J. Energy Chem. 2014, 23 (2), 207-212.

Pham, V. H.; Kim, K.-H; Jung, D.-W.; Singh, K.; Oh, E.-S .; Chung, J. S. Liquid Phase Co-Exfoliated MoS2-Graphene Composites as Anode Materials for Lithium Ion Batteries. J. Power Sources 2013, 244 (1), 280-286.

Ravikumar, R.; Gopukumar, S. High Quality NMP Exfoliated Graphene Nanosheet-Sn02 Composite Anode Material for Lithium Ion Battery. Phys. Chem. Chem. Phys. 2013, 15 (11), 3712-3717.

Zhang, H.; Gao, L.; Gong, Y. Exfoliated MoO3 Nanosheets for High-Capacity Lithium Storage. Electrochem. Commun. 2015, 52 (1), 67-70.

Kang, J. et al, Proc. Natl. Acad. Sci. U. S. A. 113, 11688-11693 (2016).

Kang, J. et al, ACS Nano 9, 3596-3604 (2015).

Green, A. A.; Hersam, M. C. Solution Phase Production of Graphene with Controlled Thickness via Density Differentiation. Nano Lett. 2009, 9 (12), 4031-4036.

Kang, J.; Sangwan, V. K.; Wood, J. D.; Liu, X.; Balla, I; Lam, D.; Hersam, M. C. Layer-by-Layer Sorting of Rhenium Disulfide via High-Density Isopycnic Density Gradient Ultracentrifugation. Nano Lett. 2016, 16 (11), 7216-7223.

Kang, J.; Seo, J.-W. T.; Alducin, D.; Ponce, A.; Yacaman, M. J.; Hersam, M. C. Thickness Sorting of Two-Dimensional Transition Metal Dichalcogenides via Copolymer-Assisted Density Gradient Ultracentrifugation. Nat. Commun. 2014, 5 (5), 5478.

Kang, J.; Sangwan, V. K.; Wood, J. D.; Hersam, M. C. Solution-Based Processing of Monodisperse Two-Dimensional Nanomaterials. Acc. Chem. Res. 2017, 50 (4), 943-951.

* cited by examiner

ANHYDROUS LIQUID-PHASE EXFOLIATION OF PRISTINE ELECTROCHEMICALLY-ACTIVE GeS NANOSHEETS

This application claims priority to and the benefit of application Ser. No. 62/575,067 filed Oct. 20, 2017—the entirety of which is incorporated herein by reference.

This invention was made with government support under DMR-1505849 and DMR-1121262 awarded by the National Science Foundation; and DE-AC02-06CH11357 awarded by the U.S. Department of Energy. The government has certain rights in the invention.

BACKGROUND OF THE INVENTION

Prior research on layered materials, such as graphene, transition metal dichalcogenides (TMDCs), and black phosphorous (BP), have established the unique properties of two-dimensional (2D) materials and their vast potential for electronic, optical, and energy applications. As a layered IV-VI semiconducting compound that is isostructural to BP, germanium sulfide (GeS) has been studied in its bulk layered form, but is a recent addition to the family of 2D materials. In addition, germanium-based materials such as GeS are ideal for lithium-ion (Li-ion) batteries due to germanium's high theoretical capacity of 1620 mAhg$^{-1}$. This value is especially impressive compared to graphite, a common commercial Li-ion battery anode material, which has a theoretical capacity of 372 mAhg$^{-1}$. Furthermore, theoretical calculations predict that GeS has a room temperature Li$^+$ diffusion coefficient 170 times greater than graphene, and extremely low diffusion barriers for alkali metal ions (0.236 eV for Li$^+$, 0.09 eV for Na$^+$ 0.05 eV for K$^+$, compared to 0.33 eV for Li$^+$ in graphene), indicating possible applications for Na- and K-ion batteries. Experiments have also demonstrated the effectiveness of GeS nanoparticles and nano-architectured GeSe as the active materials in Li-ion battery anodes. Other layered materials have shown improved electrochemical capacity retention in the 2D limit; for example, MoS$_2$ exhibits capacities of over 800 mAhg$^{-1}$ for both bulk and exfoliated anodes, but after 50 cycles, the capacity of bulk MoS$_2$ decreases to 226 mAhg$^{-1}$ while exfoliated MoS$_2$ retains high capacities over 750 mAhg$^{-1}$. In addition to possible electrochemical applications, GeS is a promising material for photovoltaics and photodetectors due to a semiconducting band gap of ~1.6 eV and high photoresponsivity of ~200 AW$^{-1}$. Thin layers of GeS would further optoelectronic applications by opening up opportunities for gate-tunability.

Despite the significant technological potential for GeS nanosheets, scalable production of 2D GeS through liquid-phase exfoliation (LPE) has not yet been achieved due to a variety of challenges. Chemical degradation of GeS in ambient conditions makes exfoliation of pristine GeS sheets difficult. Furthermore, the ratio of intralayer to interlayer force constants in GeS is ~20, which indicates a much stronger interlayer coupling than that of MoS$_2$ (~70) and graphene (~1,000). While multiple reports have demonstrated solution-phase synthesis of GeS, this bottom-up approach requires prolonged, high-temperature processing conditions that limit scalability. Similarly, alternative top-down methods such as micromechanical exfoliation are hindered by exceptionally low yields and throughput.

SUMMARY OF THE INVENTION

In light of the foregoing, it is an object of the present invention to provide methods relating to the preparation of two-dimensional germanium sulfide and related compositions, thereby overcoming various deficiencies and shortcomings of the prior art, including those outlined above. It will be understood by those skilled in the art that one or more aspects of this invention can meet certain objectives, while one or more aspects can meet certain other objectives. Each objective may not apply equally, in all its respects, to every aspect of this invention. As such, the following objects can be viewed in the alternative, with respect to any one aspect of this invention.

It can be an object of the present invention to provide one or more methods of preparing two-dimensional germanium sulfide nanomaterials in such a way as to preserve desirable electrochemical properties for electronic and energy applications.

It can be another object of the present invention to provide a method for preparation of two-dimensional germanium sulfide without resorting to chemically unstable and/or high-temperature processes and mechanical exfoliation techniques of the prior art.

It can be another object of the present invention, alone or in conjunction with one or more of the preceding objectives, to provide such a method scalable for the production of high-performance germanium sulfide nanosheets for anode and battery applications.

Other objects, features, benefits and advantages of the present invention will be apparent from this summary and the following descriptions of certain embodiments, and will be readily apparent to those skilled in the art having knowledge of various 2D material preparation methods and the fabrication of related device structures. Such objects, features, benefits and advantages will be apparent from the above as taken in conjunction with the accompanying examples, data figures and all reasonable inferences to be drawn therefrom, alone or with consideration of the references incorporated herein.

In part, the present invention can provide a method of preparing or using an anhydrous fluid medium to prepare few-layer germanium sulfide. Such a method can comprise providing a composition comprising bulk germanium sulfide and an anhydrous fluid medium; and sonicating such a composition to provide a medium comprising at least partially exfoliated nanomaterials comprising few-layer germanium sulfide as discussed elsewhere herein, having a thickness dimension selected from up to about 5 nm, about 5-about 10 nm and up to or greater than about 15 nm and combinations of such thickness dimensions. Without limitation, in certain embodiments, such a fluid medium can comprise a solvent chosen to avoid, inhibit, reduce and/or otherwise modulate germanium sulfide degradation, having a surface tension/energy comparable with germanium sulfide and/or to stabilize a germanium sulfide dispersion in such a medium. In certain such non-limiting embodiments, such a fluid medium can comprise N-methyl-2-pyrrolidone, dimethylformamide, dimethyl sulfoxide or other high-boiling solvents.

In part, the present invention can also provide a method of preparing few-layer germanium sulfide. Such a method can comprise providing a composition comprising bulk crystalline germanium sulfide and a medium comprising anhydrous N-methyl-2-pyrrolidone; sonicating such a composition to provide such a medium comprising at least partially exfoliated germanium sulfide nanomaterials; and, optionally, centrifuging and/or density gradient centrifuging such a medium to provide a supernatant component comprising few-layer germanium sulfide, as discussed above. Without limitation, the resulting germanium sulfide nanosheets can be incorporated into thin-film devices, such as but not limited to alkali metal ion anodes, cells and batteries.

In part, the present invention can also provide a composition comprising a few-layer germanium sulfide nanomaterial comprising at least one of mono-, bi-, tri- and n-layer few-layer germanium sulfide, where n can be 4-about 10 and such layer(s) can be in accordance with the thickness dimensions mentioned above and discussed elsewhere herein; and an anhydrous medium comprising N-methyl-2-pyrrolidone.

In part, the present invention can also be directed to an electronic device comprising a substrate and coupled thereto a component comprising a few-layer germanium sulfide nanomaterial of this invention. In certain embodiments, such a substrate can be a current collector, and such a component can independently comprise such a germanium sulfide nanomaterial and carbon black. Regardless, such a device can be a lithium ion battery comprising a cell comprising a germanium sulfide anode of the sort described herein, a metallic lithium cathode and a lithium ion electrolyte therebetween.

DETAILED DESCRIPTION OF CERTAIN EMBODIMENTS

As relates to certain non-limiting embodiments, the present invention provides an efficient LPE approach to 2D GeS nanosheets based on ultrasonication in an anhydrous medium such as N-methyl-2-pyrrolidone using a customized sealed-tip sonication system. The resulting GeS nanosheets possess high structural and chemical integrity with superlative electrochemical properties, particularly enabling exceptional capacity retention and high-rate performance in Li-ion battery anodes.

Figure 1A:
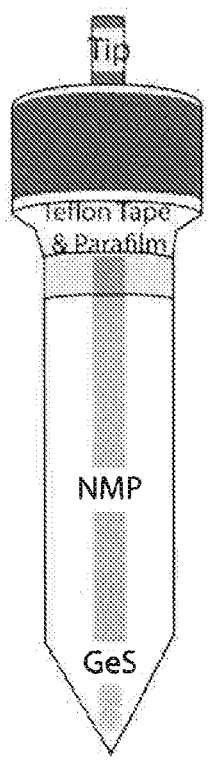
FIGS. 1A-F. (A) Schematic diagram of the sealed-tip ultrasonication apparatus. Teflon tape is wrapped around the lip of the centrifuge tube and Parafilm is wrapped around the cap and tip to minimize exposure to ambient conditions during ultrasonication. (B) Structural model of GeS, viewed along the c axis. The GeS crystal structure is orthorhombic, with lattice parameters of a=4.30 Å, b=10.47 Å, and c=3.64 Å. (C) Bright-field TEM micrograph of a GeS nanosheet. (D) Concentration of exfoliated powder GeS as a function of solvent surface tension after centrifugation at 1,000 rpm for 10 minutes. The concentration of NMP-exfoliated crystal GeS is plotted as a reference. (E) UV-Vis spectra of GeS exfoliated in solvents of different surface tensions and centrifuged at 1,000 rpm for 10 minutes. Using an estimated molar extinction coefficient at 600 nm of $\varepsilon_{600\ nm}$ =2,640 L g$^{-1}$ m$^{-1}$ and the absorbance at 600 nm, the concentration can be calculated via the Beer-Lambert law. (F) Raman spectra of a bulk GeS crystal and a film of solution-processed GeS.
Figure 1B:
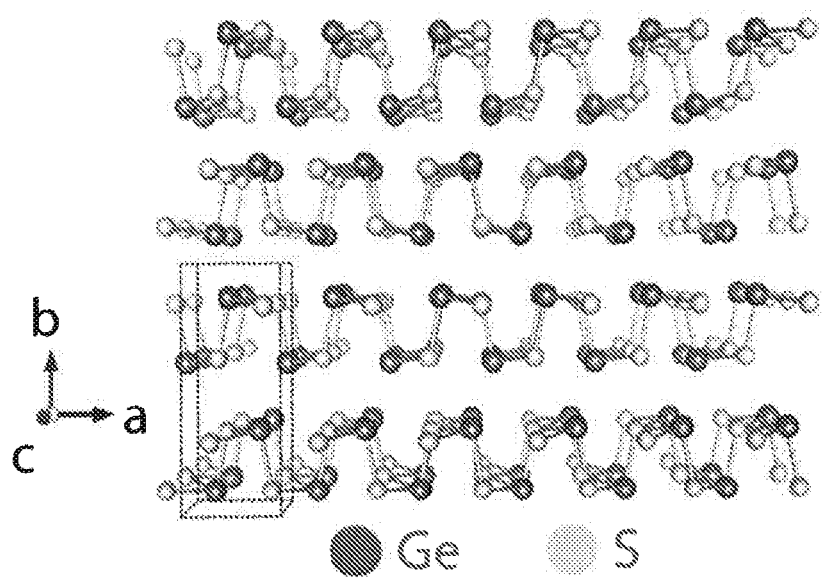
Figure 1C:
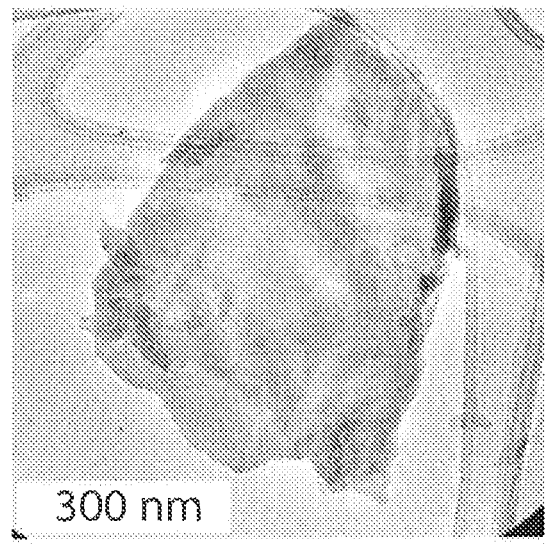

To avoid degradation of chemically reactive GeS during LPE, a sealed ultrasonication apparatus is employed to limit ambient exposure, as shown in FIG. 1A. (See, Example 1 below.) Ultrasonication shears the GeS crystal along the b-plane (FIG. 1B), resulting in thin nanosheets. To optimize the choice of solvent used in exfoliation, GeS powder is exfoliated in solvents of different surface tensions (Ethanol: 22.1 mN/m, Acetone: 25.2, Isopropanol (IPA): 23, Hexane: 18.43, Chloroform: 27.5, Dimethyl formamide (DMF): 37.1, anhydrous N-Methyl-2-pyrrolidone (NMP): 40.79). Specifically, 7.5 mg of GeS powder and 15 mL of solvent of are placed in the apparatus and sonicated in an ice bath at ~50 W for 1 hr and are subsequently centrifuged at 500 or 1,000 rpm for 10 minutes.

Figure 1D:
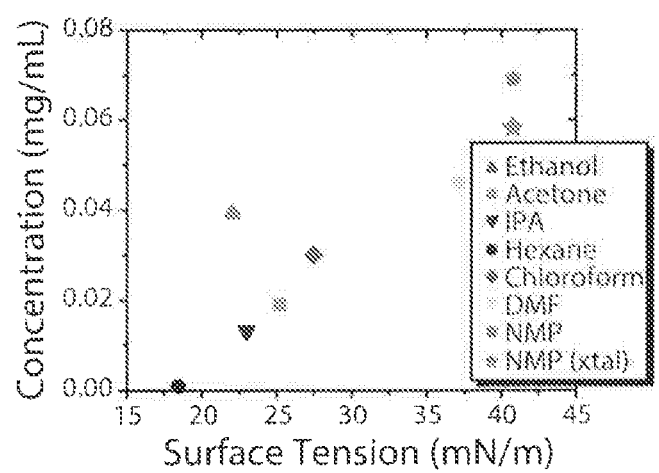
Figure 1E:
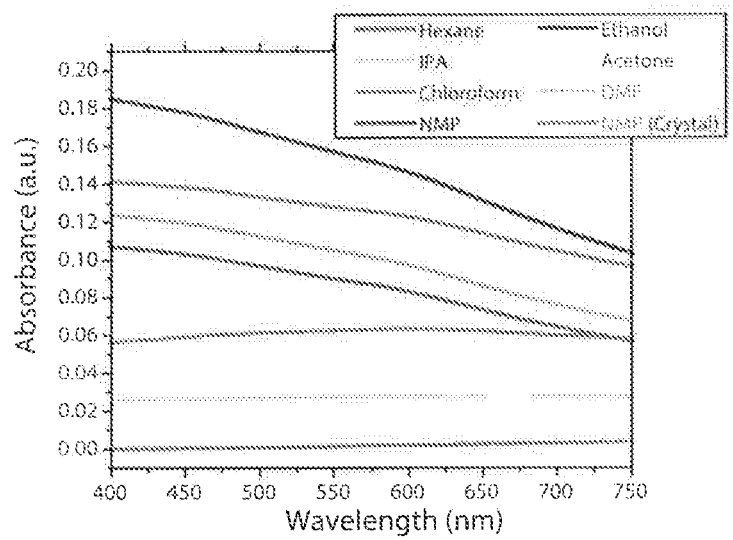
Figure 1F:
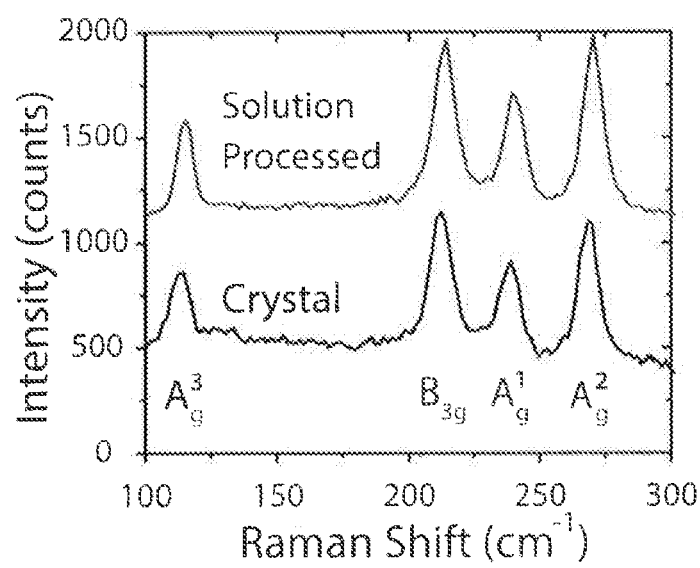

Out of the solvents studied, NMP results in the darkest dispersion post-centrifugation, suggesting its suitability in efficiently stabilizing exfoliated GeS. This observation is quantified via UV-vis spectroscopy and inductively coupled plasma mass spectrometry (ICP-MS) measurements. ICP-MS is used to measure the concentration of GeS in a given solvent, then related to the absorbance measured in UV-vis spectroscopy via the Beer-Lambert Law (A=εLc, where A is the absorbance, E is the molar extinction coefficient, L is the path length, and c is the concentration). Using an estimated $\varepsilon_{600\ nm}$=2,640 L g$^{-1}$ m$^{-1}$ and absorbances measured from UV-vis spectra, the concentrations of GeS exfoliated in different solvents and subsequently centrifuged at 1,000 rpm for 10 minutes are calculated and plotted as a function of solvent surface tension in FIG. 1D, demonstrating that powder GeS exfoliated in NMP yields the highest concentration out of all of the other solvents.

After determining that NMP is a useful solvent to exfoliate GeS, 7.5 mg of GeS crystal and 15 mL of anhydrous NMP are placed in the apparatus and sonicated in an ice bath at ~50 W for 1 hour. Under these conditions, the GeS crystal is sheared along the b-plane, resulting in thin nanosheets, as confirmed by atomic force microscopy (AFM) and transmission electron microscopy (TEM) (Figure C). Raman spectroscopy on the GeS nanosheets shows peaks that correspond to the $A^3_g$ (112 cm$^{-1}$), $B^3_g$ (213 cm$^{-1}$), $A^1_g$ (240 cm$^{-1}$), and $A^2_g$ (270 cm$^{-1}$) modes of the parent GeS crystal, which suggests that the exfoliation process does not introduce significant structural or chemical degradation (Figure F). The $B_{3\ g}$ mode corresponds to the in-plane shear vibration of parallel layers in the zigzag direction (the c-axis in FIG. 1B), while the $A_g$ modes correspond to shear vibration of parallel layers in the armchair direction (a-axis). The positions of the Raman peaks in the exfoliated GeS agree well with those of the parent crystal with similar peak widths, which suggests that exfoliation does not introduce significant structural degradation.

Figure 2A:
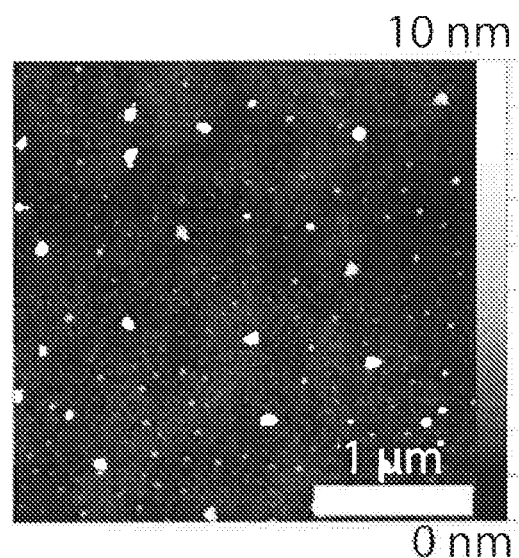
FIGS. 2A-F. (A) AFM micrograph of nanosheets dropcast onto a 300 nm SiO$_2$/Si substrate. (B) Low magnification TEM image of nanosheets. (C) Thickness and (D) lateral size histograms of the as-exfoliated GeS nanosheets. (E) Thickness and (F) lateral size histograms of the centrifuged GeS nanosheets. Thickness histograms are obtained via AFM while lateral length histograms are generated via statistical TEM analysis. Insets in (C) and (E) are photographs of the dispersions for as-prepared and 500 rpm solutions, respectively.
Figure 2B:
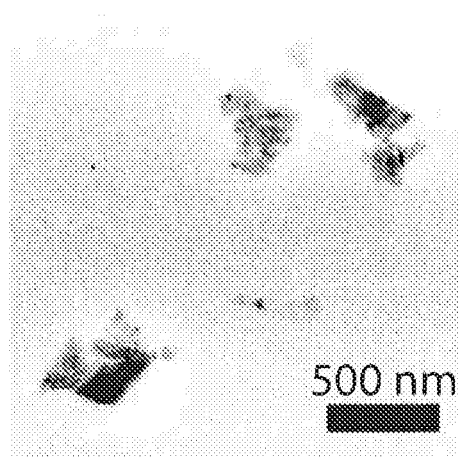
Figure 2C:
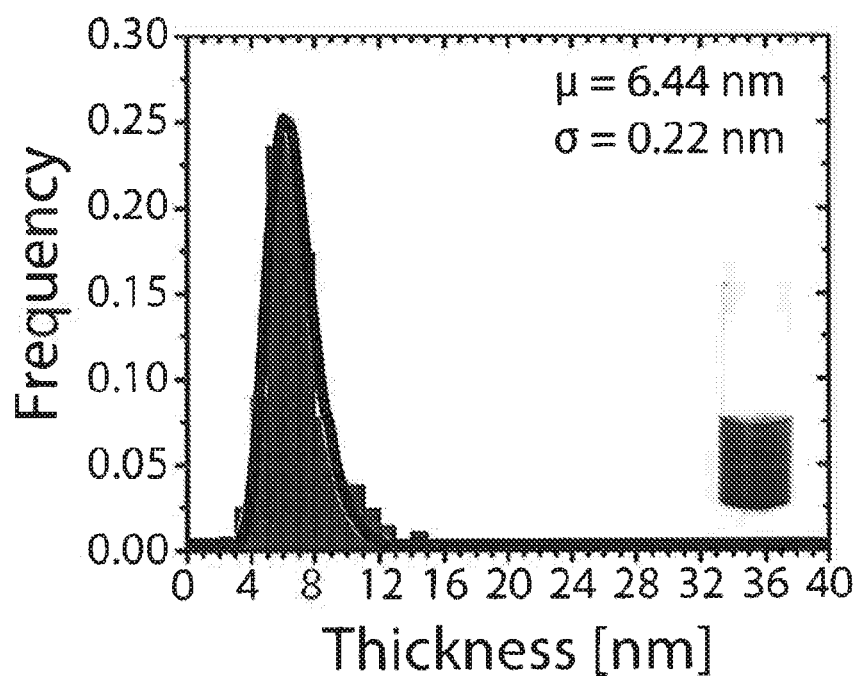
Figure 2D:
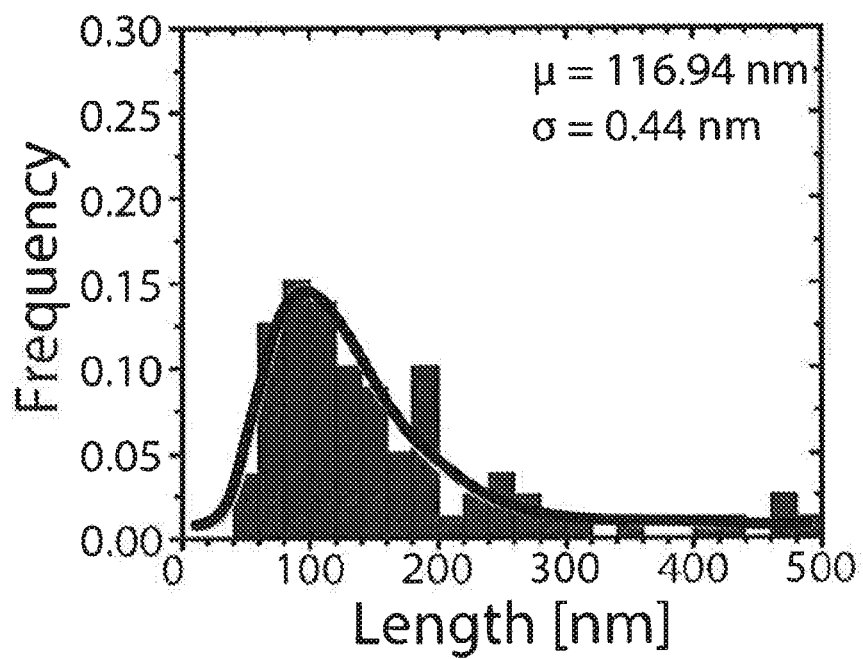
Figure 2E:
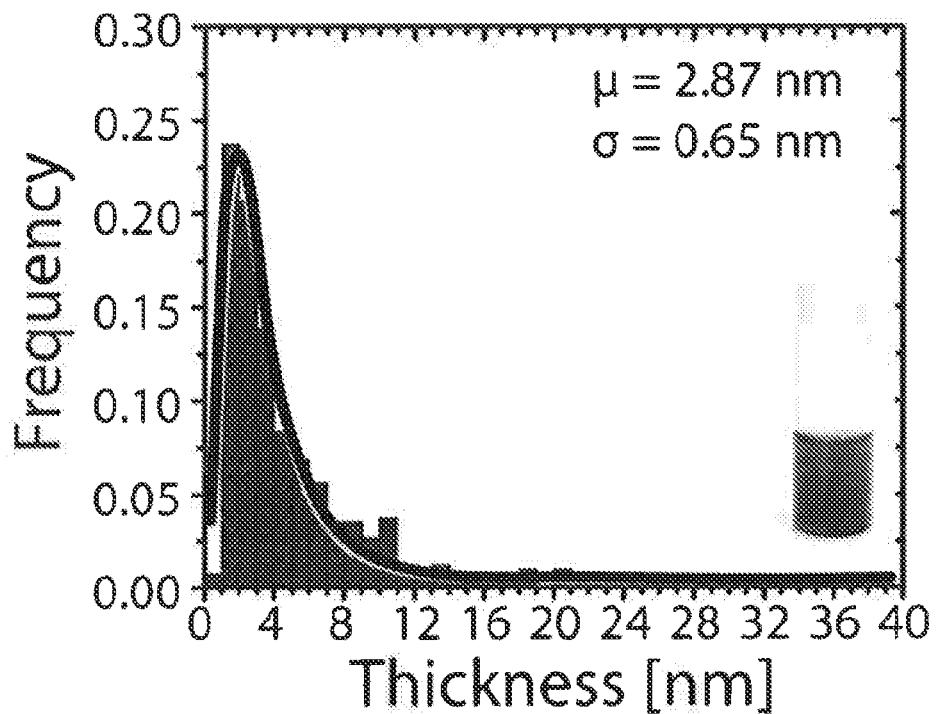
Figure 2F:
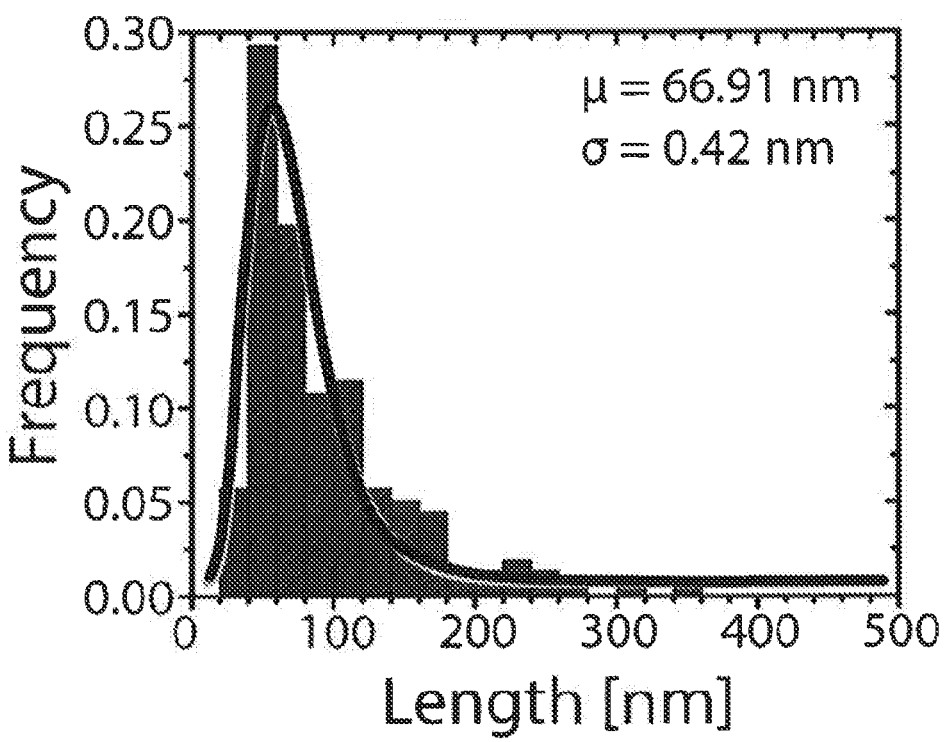

Following ultrasonication, the resulting dispersion is characterized via AFM and TEM for thickness and lateral length histograms, respectively. AFM samples are prepared by drop-casting the resulting solution on a SiO$_2$/Si substrate (FIG. 2A) while TEM samples are prepared by depositing a drop on a copper grid with a Formvar/carbon film (FIG. 2B). The resulting histograms (FIG. 2C-2F) are lognormally distributed, as predicted in literature for LPE. Each histogram is fit to the probability density function of the form $$y = y_0 + \frac{A}{x\sigma\sqrt{2\pi}}e - \left(1n\frac{x}{\mu}\right)^2 /(2\sigma^2)$$

where $y_0$ is a constant offset, A is a constant prefactor, x is either the thickness or length, μ is the lognormal mean, and σ is the lognormal standard deviation. For the as-prepared (AP) dispersion, $\mu_{Thickness,\ AP}$=6.44 nm and $\mu_{Length,\ AP}$=116.94 nm. Following centrifugation at 500 rpm for 10 minutes, the lognormal mean for the thickness and lateral length decrease to $\mu_{Thickness,\ 500\ rpm}$=2.87 nm and $\mu_{Length,\ 500\ rpm}$=66.91 nm, indicating that the larger nanosheets are sedimented out of solution due to centrifugation. Inductively coupled plasma mass spectrometry (ICP-MS) measurements measure a GeS concentration of ~0.28 mg mL$^{-1}$ immediately following sonication and ~0.11 mg mL$^{-1}$ after centrifugation at 500 rpm for 10 minutes.

Figure 3A:
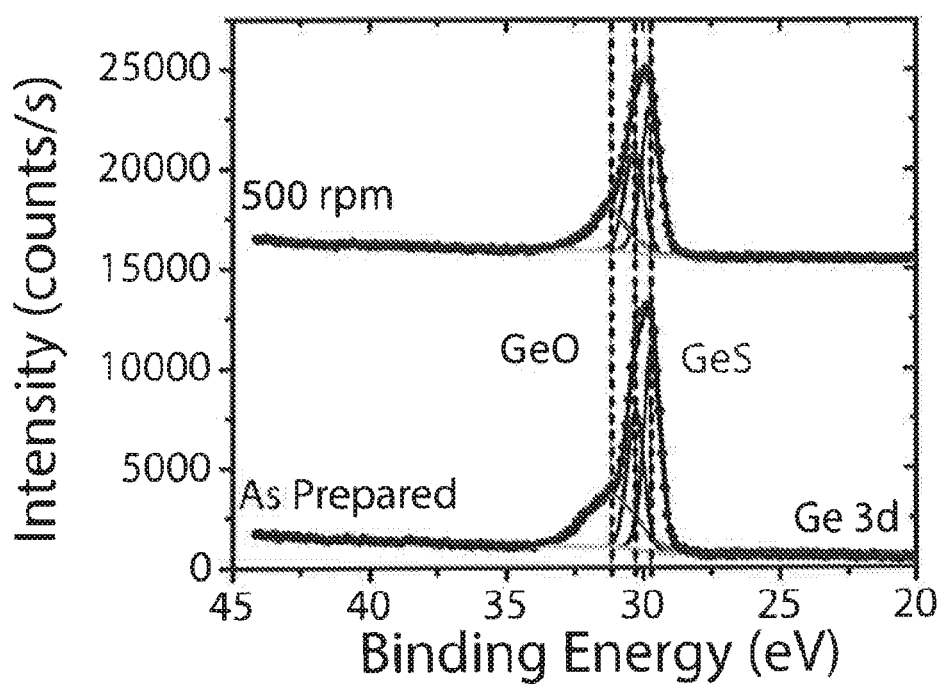
FIGS. 3A-B. XPS of LPE-processed GeS nanosheets for the core levels of (A) Ge 3d and (B) S 2p. The as-exfoliated material shows a small oxide peak, which does not increase substantially following centrifugation.
Figure 3B:
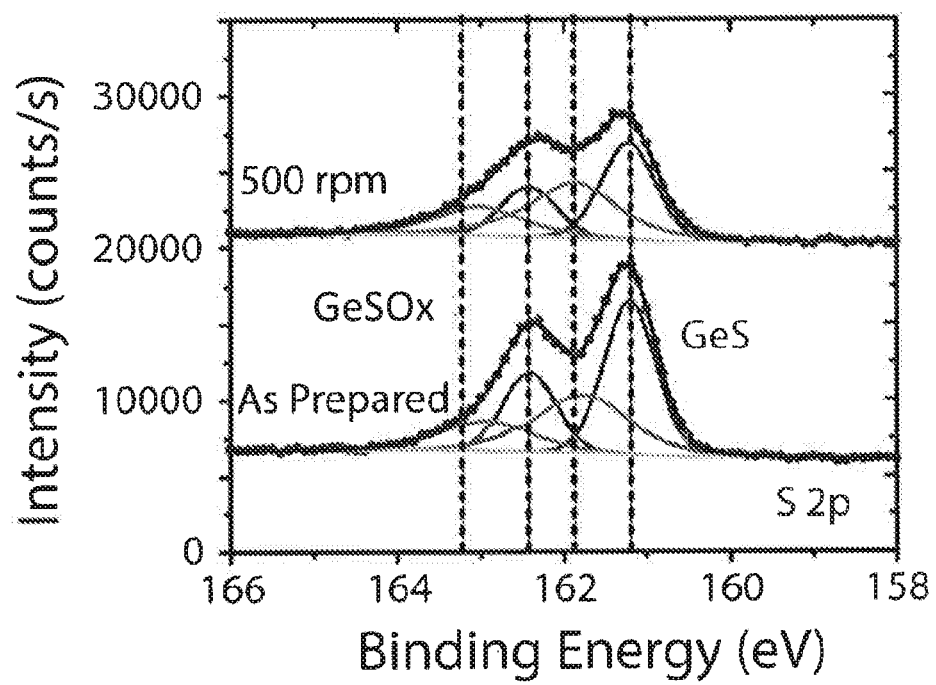
Figure 6A:
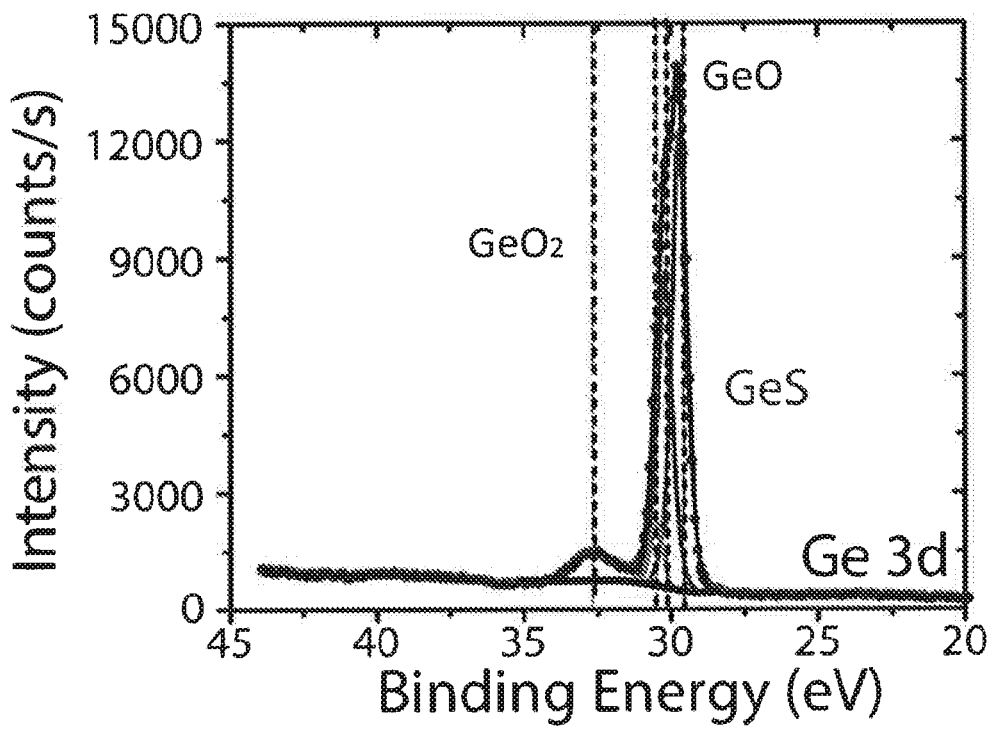
FIGS. 6A-B. XPS of the bulk GeS crystal for the core levels of (A) Ge 3d and (B) S 2p. The GeS peaks at 29.7 eV and 30.2 eV in the Ge 3d spectrum match those found in the LPE-processed GeS nanosheet sample. Similarly, the GeS peaks found in the S 2p spectrum at 161.2 eV and 162.4 eV correspond to the peaks observed in the LPE-processed GeS nanosheet sample. The oxide peak found in the Ge 3d spectrum has a peak position at 32.5 eV, which matches the position of GeO$_2$.
Figure 6B:
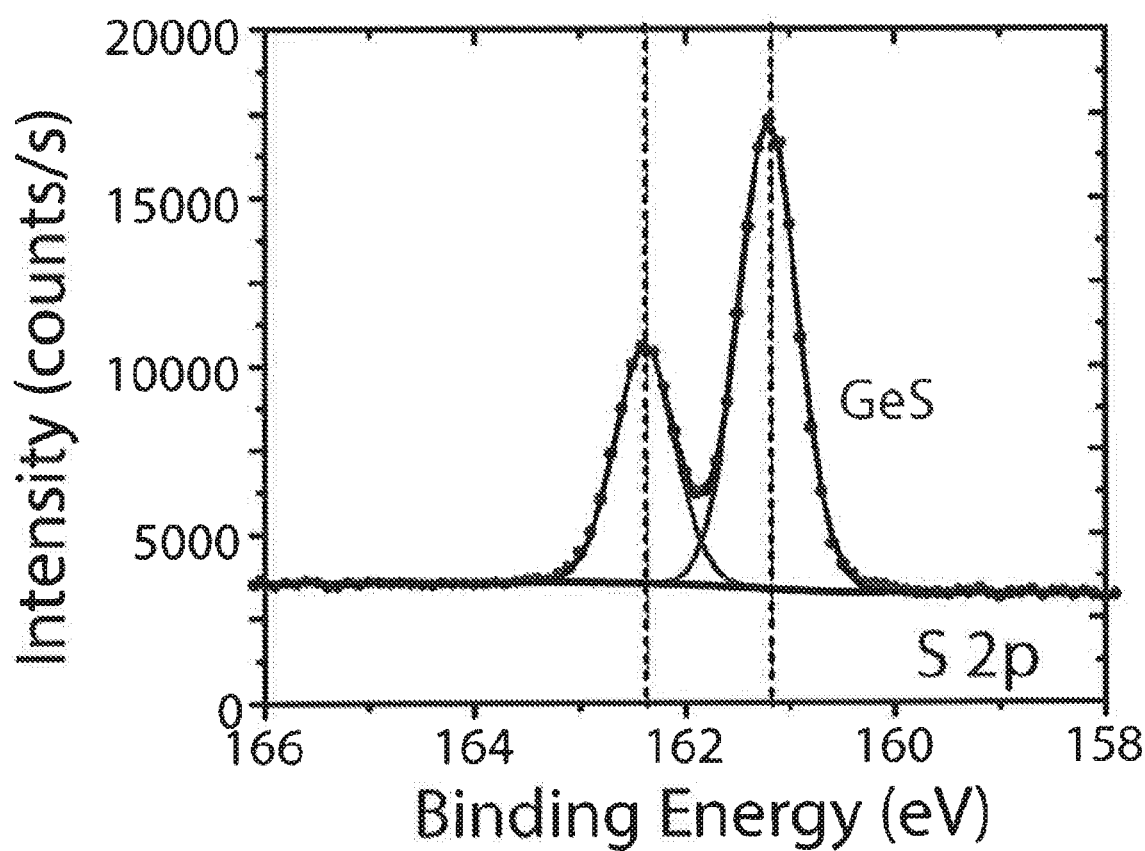

To verify that the resulting GeS nanosheets do not chemically degrade during exfoliation, X-ray photoelectron spectroscopy (XPS) was conducted on both the as-sonicated and centrifuged dispersions. FIG. 3A shows the Ge 3d XPS spectra, with a doublet assigned to binding energies of 29.7 eV and 30.3 eV for the 3d$^{5/2}$ and 3d$^{3/2}$ GeS peak, respectively, and a singlet assigned to 31.2 eV for the GeO peak. The GeS doublet indicates that the solution-processed GeS is of high chemical quality (see FIG. 6 for comparison XPS on the bulk crystal), with the smaller GeO peak attributed to surface oxide. Similarly, the S 2p peaks (FIG. 3B) confirm the presence of GeS, with a GeS doublet assigned to 161.2 eV and 162.4 eV for the 2p$^{3/2}$ and 2p$^{1/2}$ peaks, respectively, and an oxide-containing doublet assigned to 161.8 eV and 162.9 eV. Centrifugation does not noticeably alter the shape of the XPS spectra, indicating that the refined dispersion remains primarily pristine GeS, as verified by XPS quantitative analysis (available, but not shown).

Figure 4A:
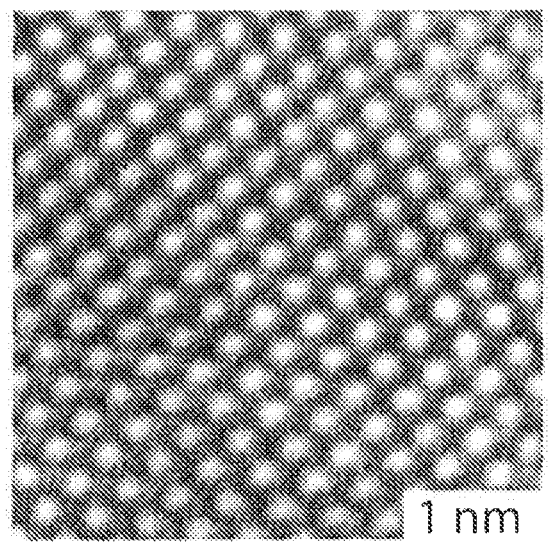
FIGS. 4A-C. (A) HRTEM micrograph, (B) atomic structure, and (C) SAED pattern of a GeS nanosheet along the out-of-plane direction. The structural integrity of the LPE-processed GeS nanosheets is supported by the highly ordered crystal lattice and sharp diffraction pattern.
Figure 4B:
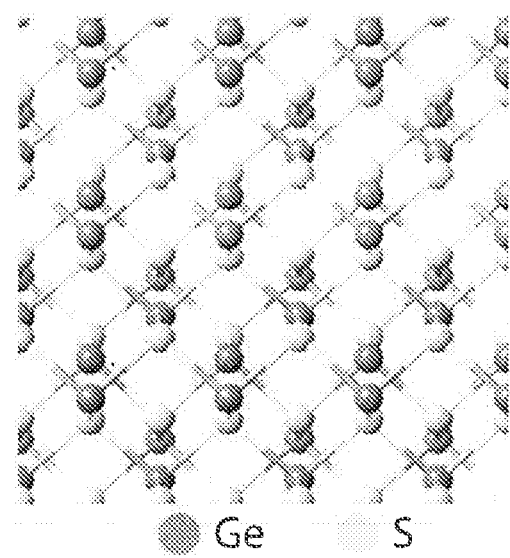
Figure 4C:
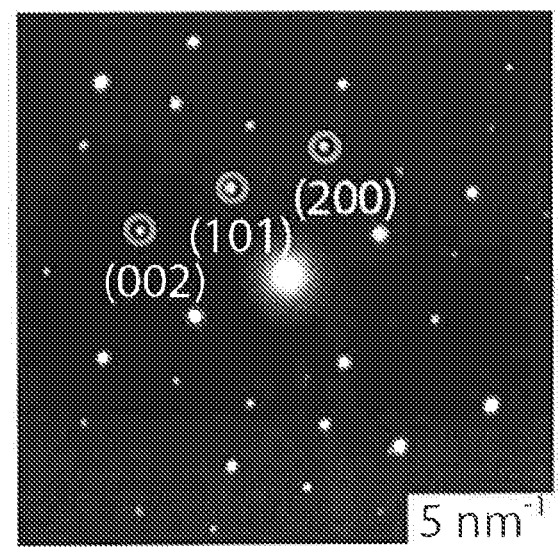

TEM further confirms the crystalline structure of LPE-processed GeS. FIGS. 4A-B shows a high-resolution TEM (HRTEM) micrograph of a GeS nanosheet and the corresponding GeS crystal lattice viewed along the out-of-plane direction. A selected-area electron diffraction (SAED) pattern was also collected (FIG. 4C), which shows sharp diffraction spots that are consistent with crystalline GeS.

Figure 5A:
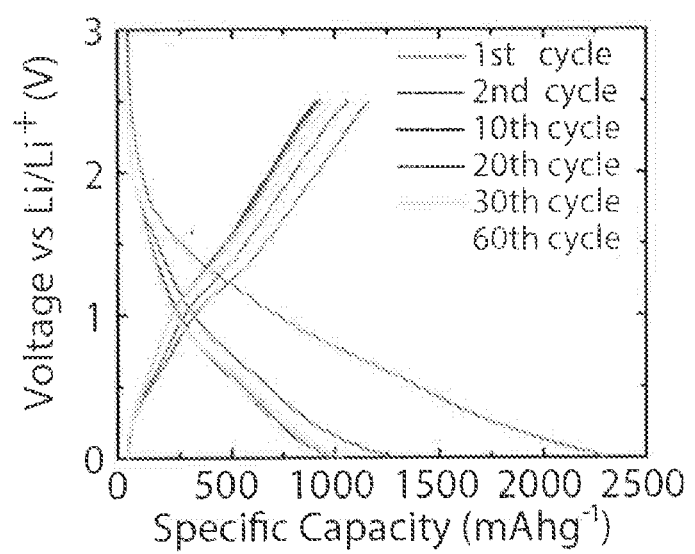
FIGS. 5A-D. (A) Voltage profile of the LPE-processed GeS anode at 0.2 C. (B) Specific capacity as a function of cycle index. The capacity stabilizes within 10 cycles. (C) Specific capacity as a function of cycle rate after stabilization. The electrode maintains a high specific capacity (231 mAh g$^{-1}$) at 10 C, showing excellent rate capability. (D) Literature comparison with other LPE or chemically exfoliated 2D materials serving as the active material in Li-ion battery anodes. Li-ion battery anodes based on LPE-processed GeS show exceptional rate performance with high capacity retention. For comparison, see the following literature references: [24] J. Xiao, D. Choi, L. Cosimbescu, P. Koech, J. Liu, J. P. Lemmon, Chem. Mater. 2010, 22, 4522; [43] R. Bhandavat, L. David, G. Singh, J. Phys. Chem. Lett. 2012, 3, 1523; [23] G. Du, Z. Guo, S. Wang, R. Zeng, Z. Chen, H. Liu, Chem. Commun. 2010, 46, 1106; [44] L. Chen, G. Zhou, Z. Liu, X. Ma, J. Chen, Z. Zhang, X. Ma, F. Li, H. M. Cheng, W. Ren, Adv. Mater. 2016, 28, 510; [45] Y. Jing, E. O. Ortiz-Quiles, C. R. Cabrera, Z. Chen, Z. Zhou, Electrochim. Acta 2014, 147, 392; [46] F. Kokai, R. Sorin, H. Chigusa, K. Hanai, A. Koshio, M. Ishihara, Y. Koga, M. Hasegawa, N. Imanishi, Y. Takeda, Diam. Relat. Mater. 2012, 29, 63; [47] Y. Liu, L. Ren, X. Qi, L. Yang, J. Li, Y. Wang, J. Zhong, J. Energy Chem. 2014, 23, 207; [48] V. H. Pham, K.-H. Kim, D.-W. Jung, K. Singh, E.-S. Oh, J. S. Chung, J. Power Sources 2013, 244, 280; [49] R. Ravikumar, S. Gopukumar, Phys. Chem. Chem. Phys. 2013, 15, 3712; and [50] H. Zhang, L. Gao, Y. Gong, Electrochem. Commun. 2015, 52, 67.
Figure 5B:
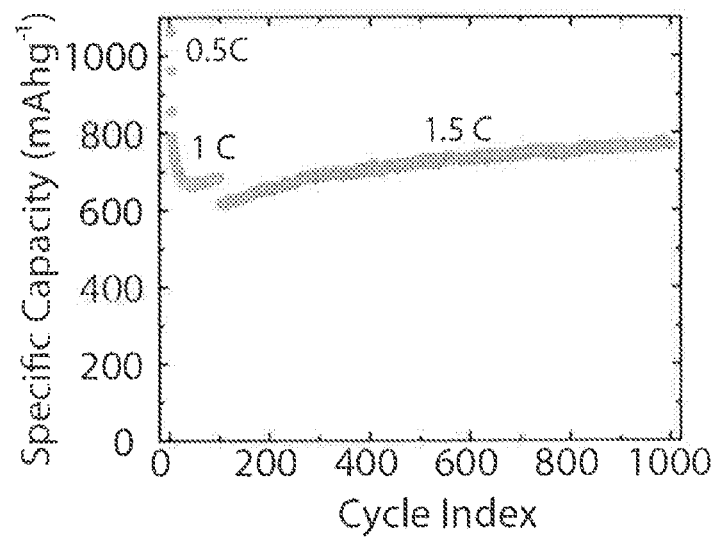

While the aforementioned structural and chemical analysis strongly suggests that LPE results in pristine GeS nanosheets, further verification can be gained from property measurements. In particular, the LPE-processed GeS nanosheets were incorporated into Li-ion battery anodes by combining them with polyvinylidene fluoride (PVDF) and carbon black (CB) in an 8:1:1 weight ratio. FIG. 5A shows the electrochemical voltage profile of the resulting GeS/PVDF/CB anode cycled at 0.2 C, where 1 C is defined as the current density needed to charge up to the first charge capacity in 1 hour (~1,100 mAg$^{-1}$). The first discharge and charge capacities are 2,295 mAhg$^{-1}$ and 1,166 mAhg$^{-1}$ respectively, corresponding to an initial Coulombic efficiency of 51% from the irreversible conversion of GeS into Ge and Li$_2$S. After 10 cycles, the charge retention stabilizes with discharge and charge capacities of 981 mAhg$^{-1}$ and 933 mAhg$^{-1}$, respectively, and a Coulombic efficiency of 95%, which corresponds to reversible Li insertion into Ge. FIG. 5B shows the long-term cycling stability where the charge capacity of the GeS/PVDF/CB anode is allowed to stabilize at 0.5 C, after which it is run at 1 C and finally at 1.5 C. The specific capacity at 1.5 C does not decrease with increasing cycle number and stabilizes at a value of 769 mAhg$^{-1}$ at 1,000 cycles.

Figure 5C:
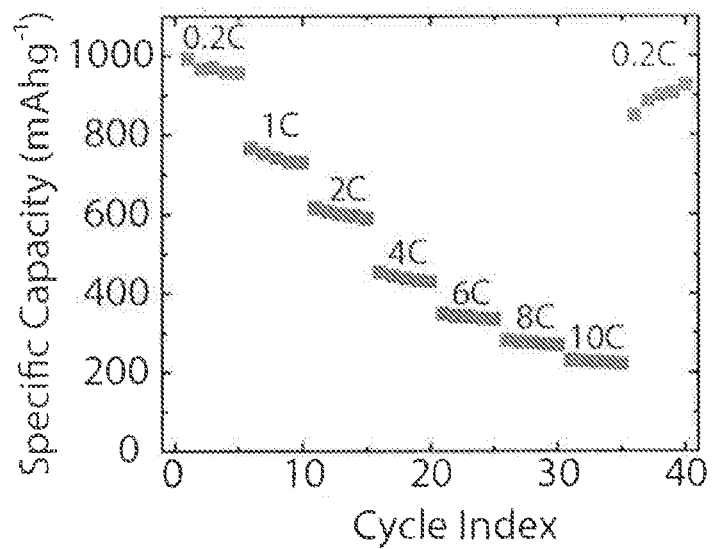
Figure 5D:
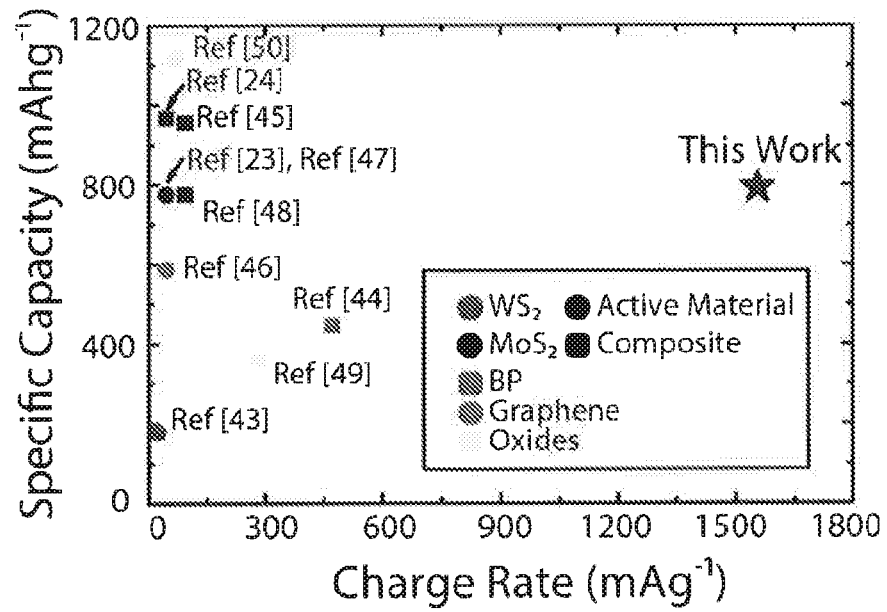

FIG. 5C further shows the specific capacity as a function of cycling rate. As the cycling rate is increased to 10 C, the GeS anode maintains a high specific capacity of 231 mAhg$^{-1}$, illustrating the viability of GeS nanosheet anodes for high current density operation. This superlative performance may be due to lower energy barriers to diffusion as well as the shorter lateral distances needed for lithium ions to diffuse into GeS nanosheets. In addition, after operating the anode at high currents, the battery recovers to its stabilized value at 0.2 C. As shown in FIG. 5D, these metrics compare favorably with other LPE or chemically exfoliated 2D materials in Li-ion battery anodes (with more in-depth information in Example 6 at Table 1, below), particularly showing much higher rate performance.

Without limitation to any one theory or mode of operation, the excellent charge retention and cycling stability of the LPE-processed GeS nanosheets Li-ion battery anodes are believed to stem from the nanostructured and electrochemically pristine nature of the material. Likewise, lower-dimensional materials such as GeS nanosheets are believed to demonstrate better performance than their bulk counterparts—due, at least in part, to larger surface-volume ratios and short Li$^+$ diffusion lengths.

Furthermore, prior work on related 2D nanomaterials such as SnS and SnS$_2$ demonstrate that the facile formation of a Li2S interfacial layer leads to high ionic conductivity for following cycles. It has been shown that the efficient formation of this layer in GeS nanoparticles is highly dependent on the crystallinity of the material. Thus, the structurally and electrochemically pristine, LPE-processed GeS nanosheets of this invention result in Li-ion battery anodes that exhibit excellent performance even at high cycling rates and cycle number.

EXAMPLES OF THE INVENTION

The following non-limiting examples and data illustrate various aspects and features relating to the method, compositions and/or devices of the present invention, including the preparation of few-layer germanium sulfide nanosheets, related compositions and devices, as are described herein. In comparison with the prior art, the present methods, compositions and devices provide results and data which are surprising, unexpected and contrary thereto. While the utility of this invention is illustrated through the use of fluid media and organic solvents which can be used therewith, it will be understood by those skilled in the art that comparable results are obtainable with various other media and solvents, as are commensurate with the scope of this invention.

Example 1

Liquid-Phase Exfoliation. GeS powder was purchased from American Elements, and GeS crystals were purchased from HQ Graphene; both were stored in a N2 glovebox to prevent ambient degradation. A customized tip sonicator setup was prepared to minimize ambient exposure, as reported previously. (See, Kang, J. et al., *Proc. Natl. Acad. Sci. U.S.A* 113, 11688-11693 (2016); and Kang, J. et al., *ACS Nano* 9, 3596-3604 (2015), each of which is incorporated by reference in its entirety.) More specifically, as applies to this invention, to minimize exposure to ambient conditions during exfoliation, a custom sealed-tip ultrasonication apparatus was prepared by puncturing the plastic lid of a 50 mL conical centrifuge tube and inserting a 0.125-inch sonicator tip in the puncture. The tip and lid were sealed by wrapping Parafilm around the puncture. Teflon tape was wrapped around the threading of the centrifuge tube to further minimize ambient exposure. For the solvent stability study, 7.5 mg of GeS powder and 15 mL of the studied solvent were added to the tube in ambient. For subsequent experiments, 7.5 mg of higher-quality GeS crystal and 15 mL of anhydrous N-methyl-2-pyrrolidone (NMP) (Sigma-Aldrich) were added to the vial in the N2 glovebox. In both cases, the sealed vial was then connected to the sonicator (Fisher Scientific Model 500 Sonic Dismembrator) in ambient conditions, and the GeS crystal was exfoliated via ultrasonication for 1 hour at ~50 W. The supernatant of the resulting dispersion was collected for use in subsequent experiments, either as-exfoliated or centrifuged with a tabletop centrifuge (Eppendorf Mircocentrifuge 5424) at 500 rpm for 10 minutes.

Example 2

Inductively Coupled Plasma Mass Spectrometry. ICP-MS samples were prepared by digesting 30 μL of GeS in NMP in 450 μL of 70% $HNO_3$ overnight in a 65° C. silicon oil bath. After digestion, the solution was diluted with 14.52 mL of DI $H_2O$ for a total dilution factor of 500. Concentrations were measured using a Thermo iCAP Q Inductively Coupled Plasma Mass Spectrometry and are the average of three measurements.

Example 3

Concentration Calculations. UV-vis spectra were collected using a Cary 6000i UV-Vis-NIR spectrophotometer. UV-vis samples were prepared by putting 200 μL of the exfoliated dispersion in 2,300 μL of the original solvent for a dilution factor of 12.5. All UV-vis spectra were collected using a quartz cuvette (Thorlabs) with a 1 cm path length. Concentrations of the crystal GeS exfoliated with NMP are measured via ICP-MS, then used to calculate the extinction coefficient of GeS at 600 nm using the Beer-Lambert Law ($A=\varepsilon Lc$), where A is the absorbance, $\varepsilon$ is the molar extinction coefficient, L is the path length, and c is the concentration. The molar extinction coefficient at 600 nm is estimated to be $\varepsilon_{600\,nm}=2,640$ L $g^{-1}$ $m^{-1}$. The concentrations for GeS exfoliated in other solvents are then calculated using the absorbance at 600 nm and the estimated value of $\varepsilon_{600\,nm}$.

Example 4

Raman Spectroscopy. Samples for Raman spectroscopy were prepared by vacuum filtration of 1 mL of the GeS nanosheet dispersion through an anodized alumina membrane (Whatman Anodisc, 25 mm diameter, 0.02 μm pore size). Raman spectra on both the bulk crystal and the exfoliated sample were collected using a Horiba LabRAM HR Evolution with an excitation wavelength of 473 nm at 0.1 mW for 60 seconds with a 2400 g/mm grating.

Example 5

Atomic Force Microscopy. AFM samples were prepared in ambient conditions by drop-casting the GeS nanosheet dispersion onto a 300 nm $SiO_2$/Si substrate and annealing on a hotplate at 250° C. until the solvent dried off. AFM height and amplitude measurements were performed in tapping mode using an Asylum Cypher S AFM with Si cantilevers at ~300 kHz resonant frequency. Images were taken with a scan rate of ~1 Hz and 512 pixels per line. For the as-prepared thickness and lateral length histograms, 628 flakes were considered, while for the 500 rpm histograms, 471 flakes were considered.

Example 6

Transmission Electron Microscopy. For statistical lateral length distributions, one droplet of the GES nanosheets dispersion was deposited onto a 200 mesh TEM copper grid coated with Formvar and supported with a carbon film and fully dried. For high-resolution TEM (HRTEM) and selected-area electron diffraction (SAED) studies, three to five droplets of the GeS nanosheet dispersion were deposited on a 300 mesh lacey carbon TEM copper grid with holes >250 nm (Ted-Pella) and fully dried using a N2 blow gun. TEM measurements were performed with a JEOL JEM-2100 TEM with an accelerating voltage of 200 keV.

For statistical lateral length distributions, 79 flakes were considered for the as-prepared distribution and 157 flakes were considered for the 500 rpm distribution. SAED patterns were simulated using SingleCrystal 3 from the CrystalMaker software package using the structure parameters a: 4.30 Å, b: 10.47 Å, c: 3.64 Å for an orthorhombic crystal.

Example 7

X-Ray Photoelectron Spectroscopy. XPS samples were prepared using the same procedure as for Raman spectroscopy. XPS measurements were performed using a high vacuum Thermo Scientific ESCALAB 250 Xi+ XPS system at a base pressure of ~1×$10^{-8}$ Torr using an Al Kα X-ray source (~1486.6 eV) with a 900 μm spot size and a 0.1 eV binding energy resolution. All presented core-level spectra are the average of five scans taken with a dwell time of 100 ms and a pass energy of 15 eV. Samples were charge compensated using a flood gun, and all core-level spectra were charge corrected to adventitious carbon at 284.8 eV. All subpeaks were fit using the software suite Avantage (Thermo Scientific). The peak assigned to GeS in the Ge 3d core-level spectra was fit with doublets, while the peaks assigned to oxides of germanium were fit with single peaks. All peaks in the S 2p core-level spectra were fit with doublets.

Subsequent quantification of the peaks was performed using the ALTHERMO1 peak library for sensitivity factors and TPP-2M IMFP energy correction options in Avantage for 3 spectra and averaged, with errors equal to the sample standard deviation. Sputtering was done in situ using the ESCALAB 250 Xi$^+$ sputtering system with a 3 keV ion gun at medium current.

Example 8

Transmission Electron Microscopy. Three to five droplets of the GeS nanosheet dispersion were deposited on a holey carbon TEM grid (Ted-Pella) and fully dried using a N2 blow gun. TEM measurements were performed with a JEOL JEM-2100 TEM with an accelerating voltage of 200 keV.

Example 9

Battery Fabrication and Testing. As-exfoliated GeS nanosheets were mixed with polyvinylidene fluoride and carbon black in an 8:1:1 weight ratio in an Ar glove box to create a slurry. The GeS slurry was then drop-cast on copper current collectors and subsequently dried in vacuum at 90° C. for 12 hours to remove excess NMP. Afterwards, the GeS anode was transferred from the oven to the Ar glove box with minimal exposure time to ambient conditions (<2 min) to prevent oxidation of GeS. 2032 type coin cells were assembled in the glove box with oxygen level lower than 0.2 ppm. The electrolyte was 1M LiFP$_6$ dissolved in an organic solvent consisting of dimethyl carbonate and ethylene carbonate in a 1:1 volume ratio. Metallic lithium was used as the counter electrode. Galvanostatic charge/discharge measurements were carried out with a voltage range from 0.01 V to 2.5 V vs. Li/Li+, using an Arbin battery test station (Model BT-2143).

TABLE 1

Comparison of liquid-phase exfoliated 2D materials in Li-ion battery anodes.

| Material System | Preparation Method | Initial Capacity (Charge Rate) | Long Term Cycling Stability (Charge Rate) |
|---|---|---|---|
| GeS (This Work) | Ultrasonication of GeS in NMP | 835 mAhg$^{-1}$ (220 mAg$^{-1}$) <br> 632 mAhg$^{-1}$ (1,100 mAg$^{-1}$) <br> 354 mAhg$^{-1}$ (5,500 mAg$^{-1}$) <br> (After stabilization) | 1000 cycles, 769 mAhg$^{-1}$ (1,650 mAg$^{-1}$) |
| MoS$_2$/PEO Composite[1] | Lithiated MoS$_2$ and mixed in 5% dissolved PEO | 1131 mAhg$^{-1}$ (50 mAg$^{-1}$) | 50 cycles, 953 mAhg$^{-1}$ (50 mAg$^{-1}$) |
| WS$_2$[2] | Superacid-assisted exfoliation | 578.6 mAhg$^{-1}$ (25 mAg$^{-1}$) | 50 cycles, 118 mAhg$^{-1}$ (25 mA/g) |
| MoS$_2$[3] | Restacked after n-BuLi exfoliation | 800 mAhg$^{-1}$ (50 mAg$^{-1}$) <br> 710 mAhg$^{-1}$ (1,000 mAg$^{-1}$) | 50 cycles, 750 mAhg$^{-1}$ (50 mAg$^{-1}$) |
| BP/Graphene[4] | Sonication in water for BP, then vacuum filtration with graphene and few-layer BP | 920 mAhg$^{-1}$ (100 mAg$^{-1}$) <br> 501 mAhg$^{-1}$ (500 mAg$^{-1}$) <br> 141 mAhg$^{-1}$ (2,500 mAg$^{-1}$) | 500 cycles, 402 mAhg$^{-1}$ (500 mAg$^{-1}$) |
| MoS$_2$-rGO[5] | n-BuLi lithiation of MoS$_2$ | ~1000 mAhg-1 (100 mAg$^{-1}$) <br> ~330 mAhg-1 (500 mAg$^{-1}$) <br> ~180 mAhg-1 (1,000 mAg$^{-1}$) <br> (After SEI formation) | 75 cycles, 940 mAhg$^{-1}$ (100 mAg$^{-1}$) |
| Graphene[6] | Graphene sediment from ultrasonication in NMP | 597 mAhg$^{-1}$ (~50 mAg$^{-1}$) | 10 cycles, 551 mAhg$^{-1}$ (~50 mAg$^{-1}$) |
| MoS$_2$[7] | Lithiated MoS$_2$, centrifuged | 1190 mAhg$^{-1}$ (50 mAg$^{-1}$) | 50 cycles, 750 mAhg$^{-1}$ (50 mAg$^{-1}$) |
| MoS$_2$-Graphene and MoS$_2$-rGO[8] | Co-exfoliation of MoS$_2$ and graphene (nanoplatelet and reduced graphene oxide) in NMP via ultrasonication | MoS$_2$-Graphene: 780 mAhg$^{-1}$ <br> MoS$_2$-rGO: 957 mAhg$^{-1}$ (100 mA/g) | MoS$_2$-Graphene: 50 cycles, 225 mAhg$^{-1}$ <br> MoS$_2$-rGO: 50 cycles, 750 mAhg$^{-1}$ (100 mAg$^{-1}$) |
| Graphene/SnO$_2$[9] | Sonication in NMP, then mixed with SnCl$_2$ and CTAB, and probe sonication | 577.7 mAh/g (100 mAg$^{-1}$) <br> 624 mAh/g (200 mAg$^{-1}$) <br> 305.8 mAh/g (300 mAg$^{-1}$) <br> (After stabilization) | 42 cycles, 311.2 mAhg$^{-1}$ (300 mAg$^{-1}$) |

TABLE 1-continued

Comparison of liquid-phase exfoliated 2D materials in Li-ion battery anodes.

| Material System | Preparation Method | Initial Capacity (Charge Rate) | Long Term Cycling Stability (Charge Rate) |
| --- | --- | --- | --- |
| $MoO_3$[10] | Sonicated in IPA | 1,100 mAhg$^{-1}$ (74 mAg$^{-1}$) <br> 750 mAhg$^{-1}$ (372 mAg$^{-1}$) <br> 550 mAhg$^{-1}$ (744 mAg$^{-1}$) <br> (After SEI formation) | 40 cycles, 1,110 mAhg$^{-1}$ (74 mAg$^{-1}$) |

[1]Xiao, J.; Choi, D.; Cosimbescu, L.; Koech, P.; Liu, J.; Lemmon, J. P. Exfoliated MoS$_2$ Nanocomposite as an Anode Material for Lithium Ion Batteries. *Chem. Mater.* 2010, 22 (16), 4522-4524.
[2]Bhandavat, R.; David, L.; Singh, G. Synthesis of Surface-Functionalized WS$_2$ Nanosheets and Performance as Li-Ion Battery Anodes. *J. Phys. Chem. Lett.* 2012, 3 (11), 1523-1530.
[3]Du, G.; Guo, Z.; Wang, S.; Zeng, R.; Chen, Z.; Liu, H. Superior Stability and High Capacity of Restacked Molybdenum Disulfide as Anode Material for Lithium Ion Batteries. *Chem. Commun.* 2010, 46 (7), 1106-1108.
[4]Chen, L.; Zhou, G.; Liu, Z.; Ma, X.; Chen, J.; Zhang, Z.; Ma, X.; Li, F.; Cheng, H. M.; Ren, W. Scalable Clean Exfoliation of High-Quality Few-Layer Black Phosphorus for a Flexible Lithium Ion Battery. *Adv. Mater.* 2016, 28 (3), 510-517.
[5]Jing, Y.; Ortiz-Quiles, E. O.; Cabrera, C. R.; Chen, Z.; Zhou, Z. Layer-by-Layer Hybrids of MoS$_2$ and Reduced Graphene Oxide for Lithium Ion Batteries. *Electrochim. Acta* 2014, 147 (1), 392-400.
[6]Kokai, F.; Sorin, R.; Chigusa, H.; Hanai, K.; Koshio, A.; Ishihara, M.; Koga, Y.; Hasegawa, M.; Imanishi, N.; Takeda, Y. Ultrasonication Fabrication of High Quality Multilayer Graphene Flakes and Their Characterization as Anodes for Lithium Ion Batteries. *Diam. Relat. Mater.* 2012, 29 (1), 63-68.
[7]Liu, Y.; Ren, L.; Qi, X.; Yang, L.; Li, J.; Wang, Y.; Zhong, J. Hydrothermal Exfoliated Molybdenum Disulfide Nanosheets as Anode Material for Lithium Ion Batteries. *J. Energy Chem.* 2014, 23 (2), 207-212.
[8]Pham, V. H.; Kim, K.-H.; Jung, D.-W.; Singh, K.; Oh, E.-S.; Chung, J. S. Liquid Phase Co-Exfoliated MoS$_2$—Graphene Composites as Anode Materials for Lithium Ion Batteries. *J. Power Sources* 2013, 244 (1), 280-286.
[9]Ravikumar, R.; Gopukumar, S. High Quality NMP Exfoliated Graphene Nanosheet-SnO$_2$ Composite Anode Material for Lithium Ion Battery. *Phys. Chem. Chem. Phys.* 2013, 15 (11), 3712-3717.
[10]Zhang, H.; Gao, L.; Gong, Y. Exfoliated MoO$_3$ Nanosheets for High-Capacity Lithium Storage. *Electrochem. Commun.* 2015, 52 (1), 67-70.

As shown, the present invention demonstrates an effective method for LPE of pristine GeS nanosheets. Using a sealed-tip ultrasonication system, exfoliation of GeS is achieved, for instance, in anhydrous NMP with minimal exposure to ambient atmosphere, thus preventing chemical or structural degradation. The chemical and structural integrity of the resulting nanosheets is confirmed by AFM, Raman, XPS, and TEM, revealing sub-10 nm thick GeS nanosheets with excellent crystallinity. Superlative electrochemical performance is verified by incorporating the GeS nanosheets into Li-ion battery anodes, resulting in high cycling stability up to 1,000 cycles and excellent rate capability up to 10 C. Overall, this work establishes a scalable pathway for producing high-performance GeS nanosheets with exceptional potential for high-power lithium-ion battery applications. Furthermore, LPE products are amenable to centrifugation-based post-processing for lateral-size separation or thickness sorting, resulting in highly monodisperse nanosheet size distributions. (See, e.g., Green, A. A.; Hersam, M. C. Solution Phase Production of Graphene with Controlled Thickness via Density Differentiation. *Nano Lett.* 2009, 9 (12), 4031-4036, and U.S. Pat. No. 9,114,405 issued Aug. 25, 2015; Kang, J.; Sangwan, V. K.; Wood, J. D.; Liu, X.; Balla, I.; Lam, D.; Hersam, M. C. Layer-by-Layer Sorting of Rhenium Disulfide via High-Density Isopycnic Density Gradient Ultracentrifugation. *Nano Lett.* 2016, 16 (11), 7216-7223, and patent application serial no. 15/800,666 filed Nov. 1, 2017; Kang, J.; Seo, J.-W. T.; Alducin, D.; Ponce, A.; Yacaman, M. J.; Hersam, M. C. Thickness Sorting of Two-Dimensional Transition Metal Dichalcogenides via Copolymer-Assisted Density Gradient Ultracentrifugation. *Nat. Commun.* 2014, 5 (5), 5478, and U.S. Pat. No. 9,221,064 issued Dec. 29, 2015; and Kang, J.; Sangwan, V. K.; Wood, J. D.; Hersam, M. C. Solution-Based Processing of Monodisperse Two-Dimensional Nanomaterials. *Acc. Chem. Res.* 2017, 50 (4), 943-951—each of which is incorporated herein by reference in its entirety.)

We claim:
1. A method of preparing layered germanium sulfide (GeS), said method comprising:
providing a composition comprising bulk GeS and an anhydrous fluid medium, wherein said anhydrous fluid medium comprises N-methyl-2-pyrrolidone (NMP); and
sonicating said composition to provide a medium comprising nanomaterials comprising layered GeS comprising at least one of mono-layer, bi-layer, tri-layer and p-layer GeS, where n is 4-10.
2. The method of claim 1 wherein said layered GeS has a thickness dimension up to 15 nm.
3. The method of claim 2 wherein said layered GeS has a thickness dimension up to 10 nm.
4. The method of claim 1 wherein said bulk GeS comprises crystalline GeS.
5. A method of preparing layered GeS, said method comprising:
providing a composition comprising bulk crystalline GeS and an anhydrous fluid medium comprising NMP;
sonicating said composition to provide a medium comprising nanomaterials comprising layered GeS comprising at least one of mono-layer, bi-layer, tri-layer and p-layer GeS, where n is 4-10; and
centrifuging said sonicated medium to provide a supernatant comprising said layered GeS.
6. The method of claim 5 wherein said layered GeS has a thickness dimension up to 15 nm.
7. The method of claim 6 wherein said layered GeS has a thickness dimension up to 10 nm.
8. The method of claim 5 wherein said layered GeS is incorporated into a device.
9. The method of claim 8 wherein said incorporation is into said device selected from alkali metal anodes, cells and batteries.
10. A method of using an anhydrous fluid medium to prepare layered GeS, said method comprising:
providing a composition comprising bulk GeS and an anhydrous fluid medium, said anhydrous fluid medium comprising a fluid component having a surface tension at least partially sufficient to at least partially exfoliate said bulk GeS; and sonicating said composition to provide a medium comprising nanomaterials comprising layered GeS comprising at least one of mono-layer, bi-layer, tri-layer and n-layer GeS, where n is 4-10, thereby modulating chemical degradation of said exfoliated GeS with said anhydrous fluid medium, wherein said anhydrous fluid medium comprises N-methyl-2-pyrrolidone (NMP).

11. The method of claim 10 wherein said bulk GeS comprises crystalline GeS.

12. The method of claim 10 comprising centrifuging said sonicated medium to provide a supernatant comprising said layered GeS.

13. A composition comprising a layered GeS nanomaterial comprising at least one of mono-layer, bi-layer, tri-layer and n-layer GeS, where n is 4-10; and an anhydrous fluid medium comprising NMP.

14. The composition of claim 13 wherein said layered GeS has a thickness dimension up to 15 nm.

15. The composition of claim 14 wherein said layered GeS has a thickness dimension up to 10 nm.

16. The composition of claim 13 comprising crystalline layered GeS.

17. An electronic device comprising a substrate coupled to a component comprising layered GeS comprising at least one of mono-layer, bi-layer, tri-layer and n-layer GeS, where n is 4-10, wherein said layered GeS is a product of liquid-phase exfoliation of bulk crystalline GeS and an anhydrous fluid medium, and is absent chemical degradation during said liquid phase exfoliation, wherein said anhydrous fluid medium comprises N-methyl-2-pyrrolidone (NMP).

18. The device of claim 17 wherein said substrate is a metal current collector.

19. A lithium ion battery comprising a cell comprising an anode comprising layered crystalline GeS comprising at least one of mono-layer, bi-layer, tri-layer and n-layer GeS, where n is 4-10, wherein said layered crystalline GeS is a product of liquid-phase exfoliation of bulk crystalline GeS and an anhydrous fluid medium, and is absent chemical degradation during said liquid phase exfoliation, wherein said anhydrous fluid medium comprises N-methyl-2-pyrrolidone (NMP).

20. The battery of claim 19 comprising a metallic lithium cathode and lithium ion electrolyte between said cathode and said anode.

* * * * *